Nov. 9, 1965   A. E. BAGGE ETAL   3,216,717
AUTOMATIC CENTERING WORK HOLDER
Filed Dec. 14, 1962   2 Sheets-Sheet 2
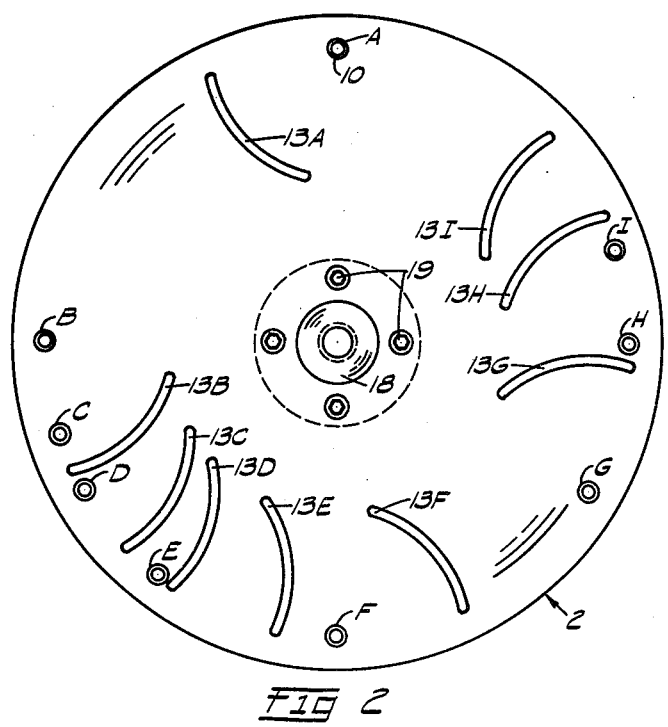
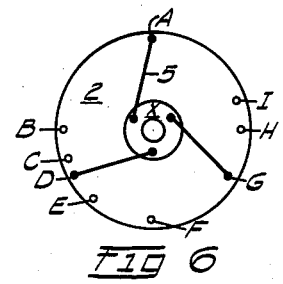
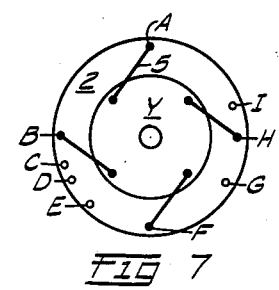
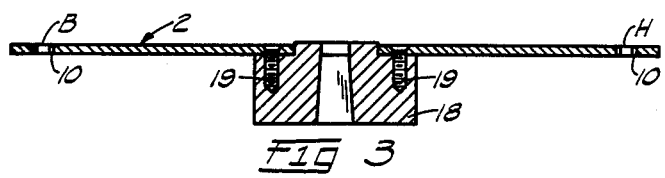
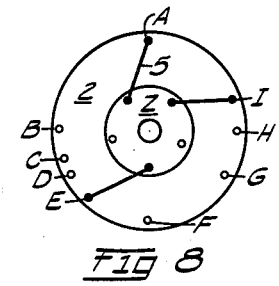
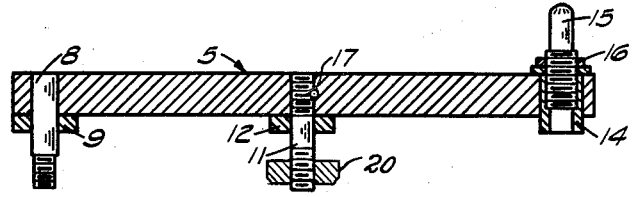
INVENTOR.
ALLAN E. BAGGE
GORDON E. HINES
BY
ATTORNEYS

United States Patent Office 3,216,717
Patented Nov. 9, 1965

3,216,717
AUTOMATIC CENTERING WORK HOLDER
Allan E. Bagge, Addison, and Gordon E. Hines, Niles, Ill. (Both of 4946 W. Warren Ave., Hillside, Ill.)
Filed Dec. 14, 1962, Ser. No. 244,734
1 Claim. (Cl. 269—47)

This invention relates in general to centering devices and in particular to an automatic centering work holder suitable for use with weight balancing machines wherein precise positioning of the work structure about its center of rotation is mandatory.

It is known that mechanical structures which rotate at relatively high speeds develop a deleterious vibration unless they are accurately weight balanced with respect to their center of rotation. Such vibration will also occur if two or more accurately weight-balanced structures are assembled off-center with respect to one another. Thus, it is important that structures and structure assemblies which rotate at high speeds be properly balanced. This may be accomplished by conventional weight balancing machines which not only balance accurately centered structures but also check whether or not two or more balanced structures are properly assembled with each other. The structure being balanced in a balancing machine is held in an exact centered position by an accurately balanced jig or work holder which is secured to the shaft of the machine.

To realize maximum utilization of the balancing machine for numerous balancing operations, a large number of precision work holders are known to be provided, each being adapted to securely hold a particular type of structure. This requires a large inventory of specially prepared work holders which are not only expensive to fabricate but consume valuable storage space. Other known work holders have special arms, clamps and/or sliding sections in order to adapt the work holders to handle several different types of structures. However, the set-up time for adjusting these multi-element work holders is large and the selection of the various combinations and location of these holding elements is often quite complex. Accordingly, it is an object of this invention to provide an automatic centering work holder which comprises a minimum of elements and which can be quickly and simply adapted to hold and accurately center any one of a wide variety of structures to be balanced.

A typical example of common mechanical structures and/or assemblies which require precise balancing and which vary in size and configuration are the clutch assemblies for automobiles. It has been chosen to illustrate this invention as applied to an automatic centering work holder for such clutch assemblies, however, it is to be understood that the invention is not limited thereto.

The work holder for clutch assemblies which are to be adjusted, repaired, tested or rebuilt usually utilize the bolt apertures in the clutch housing to secure the clutch assembly to the balancing machine. While the manufacturers of clutch assemblies invariably provide an even number of bolt apertures arranged in a circle about the center of rotation of a clutch assembly, the number of apertures and their distance from the center of the assemblies varies considerably, according to the model and make of the automobile. Therefore, a general repairing or rebuilding shop for clutch assemblies needs one or more balancing machine work holders which can be adapted to hold and accurately center any one of a large number of different clutch assemblies. It is thus another object of this invention to provide a single automatic centering work holder which can be quickly and simply adapted to hold any one of the wide variety of clutch assemblies used in present automobiles.

Another object of this invention is to provide an automatic centering work holder which can be simply adjusted to hold a clutch assembly having an even number of bolt apertures arranged in any one of a number of circles of different diameters.

A still further object is to provide an automatic centering work holder which comprises a base plate and three substantially identical supporting arms which can be positioned in predetermined locations to support any one of the above-mentioned clutch assembly configurations, even assemblies having a diameter in excess of the diameter of the base plate.

Another object is to provide an automatic centering work holder in which the supporting arms when positioned in any of a number of various locations maintain the work holder in weight balanced condition.

Still another object is to provide an automatic centering work holder which can be readily adapted to securely hold work structures having any of a number of different-sized bolt apertures.

Features of this invention are concerned with the provision of simple machined parts, interchangeable arms and interchangeable aperture studs.

While the foregoing description relates primarily to an automatic centering work holder arranged to rigidly secure work structures therein, the inventive device is equally suited for supporting solid or hollow cylindrical work structures by a clamping action on their outer periphery or by applying an outward force against the inner periphery of hollow cylindrical structures.

Other objects and features of the invention will become apparent as the description progresses and the invention will be best understood when the specification is read in conjunction with the accompanying drawings comprising FIGS. 1 to 7 in which:

FIGS. 2 and 3 show a top view and cross-sectional side view, respectively, of the base plate of the inventive work holder;

FIGS. 4 and 5 show a top view and cross-sectional side view, respectively, of one of the arms of the inventive holding device; and FIGS. 6 through 8 show simplified diagrammatic views of the inventive work holder with the arms thereof, centering and holding various clutch assemblies, each assembly having a different number of bolt apertures therein.

Figure 1:
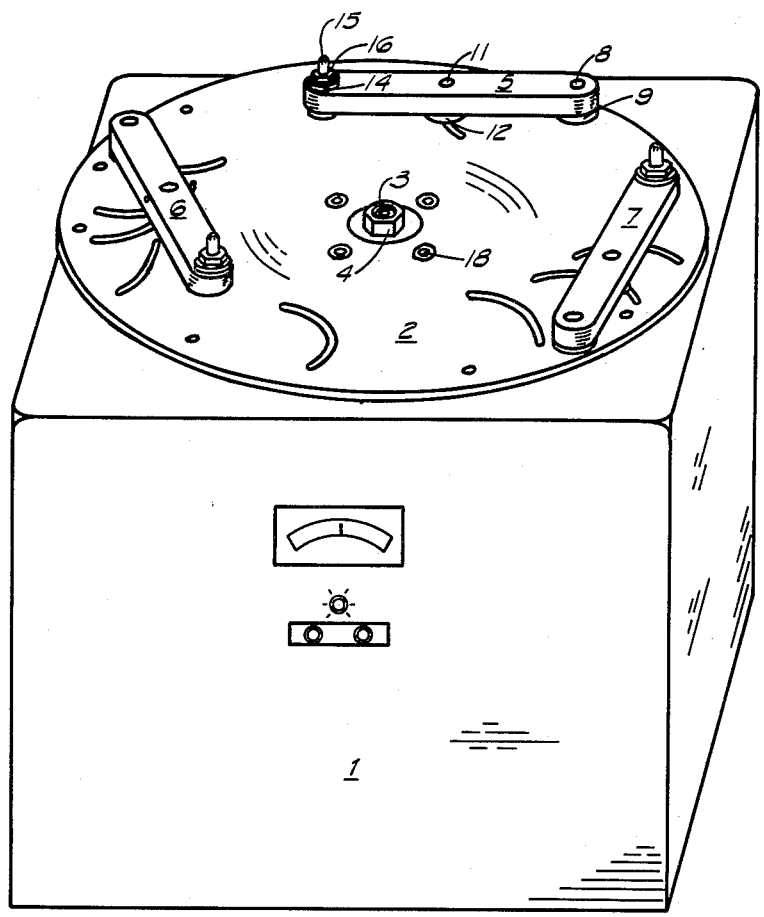
FIG. 1 shows a perspective view of the inventive automatic centering work holder with holding arms positioned thereon, all mounted on an associated balancing machine.

Referring now to FIG. 1 of the drawings, a balancing machine 1 is shown which may be any one of a number of commercially available machines. The automatic centering work holder 2 is rigidly secured to a shaft 3 of the balancing machine 1 by a threaded nut 4 such that rotation of shaft 3 directly rotates the work holder 2. The base plate 2 is precision balanced.

Three identically weighted, moment balanced and equally lengthed arms 5 to 7 are pivotably mounted on base plate 2. These arms are pivotably secured thereon by pivot studs, such as 8, which are rigidly secured in one end of the arms. The other end of the pivot studs extends through a spacing washer 9 and sleeve bearing 10 which is secured in an aperture in the base plate. The arms are maintained in the base plate 2 by a self-locking nut (not shown) engaging the threaded end of pivot stud 8 on the underside of the base plate.

A central or locking stud, such as 11, is secured in the central portion of arm 5 and extends through another spacing washer, such as 12, and further through an elongated arcuate aperture 13A in base plate 2. A threaded nut (not shown) on the underside of the base plate, locks the arm 5 in any desired position along the noted aperture 13A.

The free or non-pivoted end of arm 5 slidingly abuts the upper surface of plate 2 and contains a universal retainer 14. Retainer 14 is adapted to receive any one of a number of studs, such as 15. These studs may have different-sized external portions for fitting correspondingly sized apertures and which are securely locked in position in the retainer 14 by a locking nut such as 16.

While the pivot studs for the arms are shown inserted in three sleeve bearings which are spaced equally about the base plate with the locking studs lying within the associated elongated apertures, the arms could be pivoted in three adjacent sleeve bearings or any other sleeve bearing combination. Additionally, four arms could be used simultaneously if desired in some cases, however, in order to accurately center any work structure, a minimum of three arms is required. As is now apparent, there is a separate elongated aperture for each pivot aperture on the base plate.

From an operational standpoint, in order to secure and center a clutch housing, the pivot studs of the three arms are placed in the sleeve bearings which are selected according to the number of apertures in the work structure to be balanced. The central locking studs are caused to pass through the elongated apertures associated with the selected sleeve bearings. Thereafter, the nuts for the pivot stud and locking stud are loosely secured on respective studs and the arms are pivoted about their one end until the holding studs on the free ends of the arms pass through three corresponding aligned apertures in the work structure. These nuts are then tightened and the work structure is secured on the work holder in a precise centered location. The balancing machine is then operated in the well-known manner.

Referring now in particular to FIG. 2 of the drawings. The base plate 2 comprises a series of apertures A through I located near the outer periphery of the plate at predetermined angular displacement from one another. Each of these apertures contains a sleeve bearing or bushing similar to bearing 10 which is adapted to receive pivot stud 8.

In the description that follows, aperture A is considered the home or base aperture and all the other apertures are spaced therefrom in various relationships.

The more important group of arcs pertinent to the chosen embodiment are as follows:

GROUP I

Arc AD=120 degrees
Arc DG=120 degrees
Arc GA=120 degrees

GROUP II

Arc AB=90 degrees
Arc BF=90 degrees
Arc FH=90 degrees
Arc HA=90 degrees

GROUP III

Arc AC=108 degrees=3×36 degrees
Arc CE= 36 degrees=1×36 degrees
Arc EI=144 degrees=4×36 degrees
Arc IA= 72 degrees=2×36 degrees Each sleeved aperture A to I has a separate elongated arcuate slot such as 13A associated therewith. The distance between the center points within the slots and the center of associated sleeved aperture is equal to the distance between centers of the pivot and locking studs 8 and 11 on arm 5. Thus, the slots 13 are arcs of a circle having their center at the associated sleeved apertures and having a radius equal to the distance between the noted pivot and locking studs. The arcuate length of the slots 13 has been chosen so the free end of the arms such as 5 be positioned in any location between a point near the center of the base plate 2 and a point which lies outside the outer periphery of the base plate. In this manner, the work holder may be adapted to center a work structure having a small diameter or a work structure having a diameter greater than the diameter of the base plate.

As best seen in the cross-sectional view of the base plate 2 shown in FIG. 3, a hub 18 is secured to the underside of base plate 2 by bolts such as 19. The central portion of hub 18 is tapered to receive a correspondingly tapered shaft of the balancing machine. The portion of the hub extending through the base plate is flat and the nut for the balancing machine shaft abuts thereagainst. The base plate and hub assembly are thus securely positioned on the balancing machine shaft and the entire assembly is accurately balanced in a well-known manner.

Referring now to FIGS. 4 and 5 of the drawings, the arm 5 comprises a rectangular bar having the pivot stud 8 fitted in an aperture in one end of the arm as by a press fit and having the locking stud threadedly engaging the arm 5 near its midpoint. Locking stud 11 is locked against rotational movement by an anchoring pin 17 which is driven into a pre-drilled aperture which is selected to intersect the threaded hole for stud 11. In this way after stud 11 is threaded into the central stud aperture, the threads on stud 11 are smashed by pin 17 to thereby preclude any rotation of stud 11 when the associated nut 20 is secured thereon. Spacing washers 9 and 12 are arranged to pass over the studs 8 and 11, respectively, before the arm 5 is placed on the base plate 2. This positions the arm a predetermined distance above the base plate.

A universal retainer 14 is threadedly secured in a corresponding aperture in the free end of arm 5. This retainer 14 extends through the arm a distance equal to the thickness of the spacing washers 9 and 12 to provide three base plate contacting points. Retainer 14 has its inner periphery threaded to receive any one of a number of inserts 15 which are securely locked in position against rotational movement by nut 16. As noted the external diameter of these retainer studs are selected to match the bolt apertures in the clutch assembly being centered and balanced.

While the arms 5 are shown to be straight bars, they would function equally well if curved. Additionally, a wide variety of retainer studs could be employed or the sides of the arms could be used to clamp the work structure in proper position.

FIGS. 6 through 8 show diagrammatic views of the invention with a work structure having three, four and five evenly spaced apertures therein, respectively. Obviously, work structures having a number of evenly spaced apertures which are multiples of three, four and five could be supported in a similar manner. While four straight bars are shown holding the work structure in FIG. 7, only three are necessary for the centering function.

In FIG. 6, a work structure having three bolt apertures therein is shown, these apertures being spaced 120 degrees apart. Thus, the arms 5 to 7 are placed in sleeved apertures A, D and G which, as shown in the foregoing table, are spaced 120 degrees apart. If a six apertured work structure was being centered, one of the three disclosed arms or a fourth arm could be pivotly positioned in base plate aperture F since aperture F is 180 degrees from aperture A and could always be used on a work structure having an even number, greater than two, of spaced apertures therein.

In FIG. 7, a work structure having four (or multiples thereof) bolt apertures is held in position by any three arms having their pivot studs positioned in base plate apertures A, B, F and/or H. These base plate apertures are all spaced 90 degrees apart as shown in the foregoing table.

In FIG. 8, a work structure having five (or multiples thereof) bolt apertures is held centered by the three noted arms positioned in base plate apertures A, E and I. If a ten bolt aperture work structure was being positioned, an arm 5 could be positioned in base plate aperture C, which is 108 degrees from base plate aperture A.

It will be noted that base plate aperture A is used when a three, four or five aperture (or multiples thereof) work structure is centered. To simplify the setup operation, this aperture may be stamped with the numerals 3-4-5. Since aperture F may be used with a four or a six apertured work structure, it may be stamped 4-6. Base plate apertures B and H, are used on four apertured structures, other than those structures having 20, 40, 60 or more apertures and thus may be stamped with a single numeral 4. Similarly, apertures E and I may be marked with the single numeral 5.

The aperture C is preferably marked with the numeral 5 although it will be used only on structures having bolt apertures which are multiples of ten. Similarly, aperture F could be used on a ten-apertured structure and could thus be marked 4-5-6 instead of just 4-6.

With the base plate apertures marked as above indicated, an operator first ascertains the number of apertures in the work structure to be centered; calculates the lowest valued factor thereof which is equal to one of the three values "3," "4" or "5"; places three arms in the three different base plate apertures which are marked with the calculated factor; pivotably adjusts the arms until the aperture studs thereon pass through the corresponding apertures in the work structure; and then secures the nuts on the corresponding central control and pivot studs as above described.

The foregoing operational description was concerned with holding and centering work structures independently of balancing considerations. The operation of the invention in holding and automatically centering work structures which are to be weight-balanced by high speed rotation of the work structure will now be described.

In weight-balanced operations using the inventive work holder, aperture E can be used with work structures having five equally spaced bolt apertures only if compensating weights are employed. Additionally, in some instances, four arms will be required to hold and center the work structure being balanced in order to maintain the work holder properly weight-balanced during high speed rotation. Throughout this portion of the description, it is important that the base plate 2 is accurately weight-balanced about its center of rotation.

When the work structure being supported and automatically centered for weight balancing purposes has a number of equally spaced bolt apertures which are multiples of three, the three arms 5, 6, and 7 are placed in respective apertures A, D and G. The weight of these arms has been accurately matched with each other and these arms have been accurately moment balanced. These three arms, when placed in the noted apertures A, D and G, are evenly spaced around the center of balanced base plate 2 and the work holder comprising the base plate and arms are still weight balanced. Since the arms 5 to 7 have been moment balanced, the location of the free ends thereof when a work structure is positioned thereon does not destroy this noted balance. Thus, any variations in balance of the combination of the work holder and the work structure supported thereon is a result of work structure unbalance only.

When the work structure being supported and automatically centered for weight balancing purposes contains a number of equally spaced bolt apertures which are multiples of four, the three arms 5 to 7 and an additional arm similarly weight and moment balanced are used. These four arms are placed in base plate apertures A, B, F and H. Since these four arms are evenly distributed around the center of base plate 2, the entire work holder is still properly weight-balanced.

When the work structure being positioned and automatically centered for weight-balancing purposes has an even number of equally spaced bolt apertures which is a multiple of five, the noted four arms are placed in base plate apertures A, C, F and I. Under these conditions, the combined weight of any two arms is equal to the combined weight of the other two arms. Since the arm in aperture A is angularly displaced 180 degrees from the arm in aperture F and the arm in aperture I is angularly displaced 180 degrees from the arm in aperture C, the weight of the four arms is equally distributed around the center of base plate 2 and the work holder is still in a weight balanced condition.

From the foregoing, it can be seen that the inventive work holder can be used not only as a holding and centering device but also can be used for weight balancing operations. Thus, while the holding and automatic centering features of the invention are disclosed as applied to a balancing machine, they would equally apply to grinding machines, lathes and the like.

While we have described our invention in conjunction with specific apparatus, it is to be clearly understood that this description is made only by way of example and not as a limitation on the scope of the invention.

What is claimed is:

A work holder for supporting and automatically centering work structures of the type having a plurality of evenly spaced apertures located equal distances from the center of the work structure, comprising a base plate having a plurality of pivot apertures therein arranged in a circle and spaced apart from one another at given distances and having elongated arcuate apertures for respective pivot apertures, at least three extension arms each having a pivot stud adapted for insertion in any desired one of said pivot apertures to pivotally support said arm on said base plate, and each having a locking stud adapted for insertion in respective arcuate apertures, each of said arms further having a holding stud adapted for insertion in any desired one of said work structure apertures, the insertion in the pivot studs of at least three arms in three predetermined ones of said pivot apertures jointly with the insertion of the holding studs of the last said three arms in three predetermined ones of said work structure apertures supporting and automatically centering said work structure with respect to said circle of pivot apertures, and means cooperating with said locking studs to lock the said arms, independently of the said holding studs, in any desired position.

References Cited by the Examiner
FOREIGN PATENTS
687,779  2/53  Great Britain.

WILLIAM W. DYER, Jr., *Primary Examiner.*
ROBERT C. RIORDON, *Examiner.*